(12) United States Patent
Desai et al.

(10) Patent No.: US 11,822,633 B1
(45) Date of Patent: Nov. 21, 2023

(54) AUTHENTICATION BASED ON MOTION AND BIOMETRIC DATA

(71) Applicant: United Services Automobile Association (USAA), San Antonio, TX (US)

(72) Inventors: Snehal Desai, Richardson, TX (US); Matthew Flachsbart, Grapevine, TX (US); Bradley Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 201 days.

(21) Appl. No.: 17/076,536

(22) Filed: Oct. 21, 2020

Related U.S. Application Data

(63) Continuation of application No. 15/867,157, filed on Jan. 10, 2018, now Pat. No. 10,824,703.
(Continued)

(51) Int. Cl.
| | |
|---|---|
| *H04L 29/06* | (2006.01) |
| *G06F 21/32* | (2013.01) |
| *G06F 21/62* | (2013.01) |
| *G06V 40/70* | (2022.01) |
| *G06N 20/00* | (2019.01) |
| *G06V 40/10* | (2022.01) |
| *G06V 40/16* | (2022.01) |

(Continued)

(52) U.S. Cl.
CPC .......... *G06F 21/32* (2013.01); *G06F 21/6218* (2013.01); *G06V 40/70* (2022.01); *G06N 20/00* (2019.01); *G06V 40/1365* (2022.01); *G06V 40/15* (2022.01); *G06V 40/172* (2022.01); *G06V 40/197* (2022.01)

(58) Field of Classification Search
CPC ..... G06F 21/32; G06F 21/6218; G06V 40/70; G06V 40/1365; G06V 40/15; G06V 40/172; G06V 40/197; G06N 20/00
See application file for complete search history.

(56) References Cited

U.S. PATENT DOCUMENTS

| | | | |
|---|---|---|---|
| 2003/0039380 A1* | 2/2003 | Sukegawa | G06K 9/6255 382/118 |
| 2015/0310444 A1 | 10/2015 | Chen et al. | |

(Continued)

*Primary Examiner* — Joseph P Hirl
*Assistant Examiner* — Leynna Truvan
(74) *Attorney, Agent, or Firm* — Fletcher Yoder, P.C.

(57) ABSTRACT

Techniques are described for authenticating an individual based at least partly on a tremor signature of the individual. Motion data is collected through motion sensor(s), such as accelerometers, gyroscopic motion sensors, and so forth, of a portable computing device that is being held, worn, or is otherwise in contact with the user. Based on the collected motion data, a tremor signature may be determined and compared to a previously determined model for the user, and an authentication determination may be made based on the comparison. The tremor signature may be used in combination with other information to authenticate the user. For example, the tremor signature may be used in combination with location information and/or other biometric data such as a fingerprint scan, image of the user's face, audio recording of the user's voice, the user's heartbeat, a cardiac electrical signature, bio-electrical impedance, and so forth.

20 Claims, 4 Drawing Sheets

Related U.S. Application Data

(60) Provisional application No. 62/453,091, filed on Feb. 1, 2017.

(51) Int. Cl.
  *G06V 40/18* (2022.01)
  *G06V 40/12* (2022.01)

(56) References Cited

U.S. PATENT DOCUMENTS

| | | | | |
|---|---|---|---|---|
| 2015/0338915 A1* | 11/2015 | Publicover | ........... | G06V 40/193 345/633 |
| 2016/0054977 A1* | 2/2016 | Gritton | ................ | G06F 3/0346 345/156 |

* cited by examiner

AUTHENTICATION BASED ON MOTION AND BIOMETRIC DATA

CROSS-REFERENCE TO RELATED APPLICATION

The present disclosure is a continuation of U.S. patent application Ser. No. 15/867,157, filed Jan. 10, 2018 and claims priority to, U.S. Provisional Patent Application Ser. No. 62/453,091, titled "Tremor Based Authentication," which was filed on Feb. 1, 2017, the entirety of which is incorporated by reference into the present disclosure.

BACKGROUND

Organizations and individuals that operate and/or manage computing systems may implement various security measures to prevent unauthorized individuals, devices, and processes from accessing secured data stored on the systems, gaining control of processes executing on the systems, introducing new (e.g., malicious) processes to the systems, and/or gaining unauthorized access for other purposes. Traditionally, a user may provide one or more credentials to gain access to a system. Such credentials may include a username, password, and/or personal identification number (PIN). By comparing the supplied credentials with previously established credentials for the user, a determination may be made whether to permit or deny the requested access. In some instances, tokens such as cryptographic keys may be employed to authenticate an individual and/or verify that an individual or process is authorized to access a system. Cryptographic keys may also be employed to secure communications over a network.

SUMMARY

Implementations of the present disclosure are generally directed to authentication of individuals using biometric and/or biologically determined information. More specifically, implementations are directed to determining a motion (e.g., tremor) signature for an individual based on measured motion(s) in at least a portion of the individual's body, and employing the motion signature to authenticate the individual for secure access to a device, stored data, an application, and/or for other purposes.

In general, innovative aspects of the subject matter described in this specification can be embodied in methods that include operations of: receiving motion data collected by one or more motion sensors of a user device, the motion data describing motions of at least one body part of a user of the user device; determining a tremor signature for the user based on an analysis of the motion data; receiving biometric data collected by one or more biometric sensors, the biometric data describing at least one physiological characteristic of the user other than the tremor signature; determining an authentication result for the user based on a comparison of the tremor signature and the biometric data to a model that at least describes a baseline tremor signature and baseline biometric data for the user; and based on the authentication result indicating a successful authentication of the user, providing access to secure information through the user device.

Implementations can optionally include one or more of the following features: the operations further include receiving location data collected by one or more location sensors, the location data describing a current location of the user; the model further describes at least one baseline location for the user; determining the authentication result is further based on a comparison of the location data to the model that describes the at least one baseline location for the user; the tremor signature is determined periodically based on the motion data that is periodically collected by the one or more motion sensors; the biometric data is collected periodically by the one or more biometric sensors; the authentication result is determined periodically based on the comparison of the periodically determined tremor signature and the periodically collected biometric data; the model is developed using a machine learning algorithm; the operations further include employing the tremor signature and the biometric data to update the model, based on the authentication result indicating a successful authentication of the user; the operations further include performing a credential-based authentication of the user, based on the authentication result indicating an unsuccessful authentication of the user; the operations further include employing the tremor signature and the biometric data to update the model, based on a successful credential-based authentication of the user; at least one translational motion of the at least one body part of the user; at least one rotational motion of the at least one body part of the user; the biometric data describes one or more of a fingerprint of the user, an image of at least a portion of a face of the user, a retinal scan of the user, a heartbeat of the user, a cardiac electrical signature of the user, and a bio-electrical impedance of the user; the secure information includes one or more of a secure feature of the user device, a secure feature of an application executing on the user device, data stored in a secure location on the user device, and data stored in a secure location on a remote computing device; determining the authentication result for the user further includes combining the tremor signature and the biometric data to determine a combined authentication signature for the user, comparing the combined authentication signature to a baseline authentication signature for the user to determine the authentication result; determining the authentication result is included in a periodically iterated authentication of the user, such that access for the user is disabled in response to detecting a change in the authentication result; determining the authentication result further includes classifying the tremor signature and the biometric data into one or more parameter matrices, performing at least one statistical operations on the one or more parameter matrices, computing one or more properties of a resulting statistical data matrix to obtain an authentication signature profile, and comparing the authentication signature profile to a baseline authentication signature profile for the user to determine the authentication result; determining the authentication result further includes employing a plurality of potential models of combined tremor signature and biometric data for contextual authentication, the plurality of potential models being applicable to different circumstances of the user; the operations further include creating a new potential model in response to one or more failures to authenticate the user with self-similar data sets using at least one of the plurality of potential models; the operations further include in response to determining that the biometric data for an authentication request does not match any of the plurality of potential models and is close to two or more of the potential models, posing a contextual question to the user to select one of the two or more potential models; the contextual question is posed during a learning mode associated with a newly created potential model; and/or the contextual question is varied semantically among instances when the context question is posed to users.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and technical improvements over previously available solutions. By authenticating an individual using a motion signature that is determined based on detected motion(s) (e.g., tremor) in the individual's body, implementations provide an authentication technique that is unobtrusive and easy from the perspective of the individual being authenticated, with minimal effort performed by the individual. This provides a more positive user experience compared to traditional techniques in which the individual may be asked to remember and enter a username, password, personal identification number (PIN), answers to knowledge-based questions (e.g., what is your mother's maiden name?), and/or other credential(s). Moreover, implementations provide an authentication technique that is more secure and less vulnerable to spoofing compared to traditional authentication methods. Traditional user credentials (e.g., password, PIN, etc.) may be guessed or stolen, but a motion signature based on measured motions of the individual's body would be much more difficult to spoof Implementations further inhibit spoofing by correlating known and ongoing real-time biometric (e.g., bio-signal) analysis from the user and device(s) operated by, or in proximity to, the user. For example, a user may be wearing a heart rate monitor, as a standalone sensor, fitness tracking device, wearable computer, or other suitable user device.

In some implementations, multiple biometric sensors used for authentication are incorporated within the user device that is to be employed for authenticating the user. In some implementations, the sensors may be distributed throughout an area in proximity to the user such that they may (e.g., remotely) determine biometric data for the user. The data from these distributed sensors may be correlated and computed in real-time on the user device and/or on server device(s) (e.g., in the cloud). The data from the biometric sensors and the user device may be stored on the user device and/or the server device(s) (e.g., in the cloud), and may be used to create and/or refine the biometric models employed for authentication. The user device may provide current heart rate information that enables a determination that the user is alive, to verify that the tremor signature of the user is not pre-recorded as in a replay-type spoof attack.

Implementations provide further technical improvements and advantages over traditional authentication systems. Because traditional systems may require users to accurately remember and enter user credentials (e.g., username, password, PIN, etc.), traditional systems are susceptible to failed attempts at authentication caused by wrong, mistyped, or forgotten credentials. By providing an authentication technique that does not require the user to accurately remember and enter credentials, implementations may reduce or eliminate authentication failures. Accordingly, implementations avoid the expenditure of processing capacity, memory, storage space, network bandwidth, and/or other computing resources that traditional systems need to expend to recover from failed authentication attempts. Implementations may surpass and/or bypass (e.g., leapfrog) traditional security methods, such as the use of credentials, by providing ongoing passive and/or immersive authorization and/or authentication based on a detected tremor signature of the user.

Implementations may also employ artificial intelligence and/or machine learning techniques for biometric authentication and/or correlation of bio-signal data (e.g., a tremor signature). For example, the software that creates, processes, retrieves, and/or examines the tremor signature may maintain a model of the user, the model including a recent or current tremor signature of the user along with other biometric and/or identifying information for the user such as a baseline for voiceprint information, heartbeat and/or heart rate information, cardiac electrical signature, fingerprint data, retinal scan data, location of the user, bio-electrical impedance, and so forth. The model may be compared to current biometric information collected for the user, such as a tremor signature, and a correspondence between the current information and the model may lead to a positive authentication of the user. The model may be refined over time based on ongoing collection of biometric information for the user.

In some implementations, the data from two or more biometric sensors may be combined to computationally derive a unique signature for authentication, wherein data from a single biometric sensor alone may not provide a sufficiently unique signature for authenticating the user (e.g., for distinguishing the user among a population of users). For example, a tremor signature, also described as a tremor biometric, motion signature, and/or motion biometric may not be unique per individual, but the tremor signature can be computationally combined with other biometric data, such as heartbeat signature, bio-electrical impedance data, and so forth, to generate a combined signature that is unique to a particular user. Implementations may be employed to authenticate a user for applications or other environments in which continuous authentication (e.g., periodically iterated, ongoing authentication over a period of time) is called for, such as in instances where an application may shut down or disable activity if a non-recognized user is detected holding the user device. Further, implementations can utilize the biometric data to compare against baseline biometric data and detect trends that could indicate diseases or other developing medical conditions in a user. For example, if a user is not authenticated because they exhibit a high tremor rate or rapid heartbeat compared to their baseline signature, the new biometric data can be compared with characteristics of certain conditions, for instance, heart arrhythmias. An identified correspondence between the user's biometric data and symptoms of a medical condition may trigger a notification to be sent to the user and/or other(s) (e.g., the user's medical staff), and/or may be used to further refine a temporary authentication model for such conditions.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
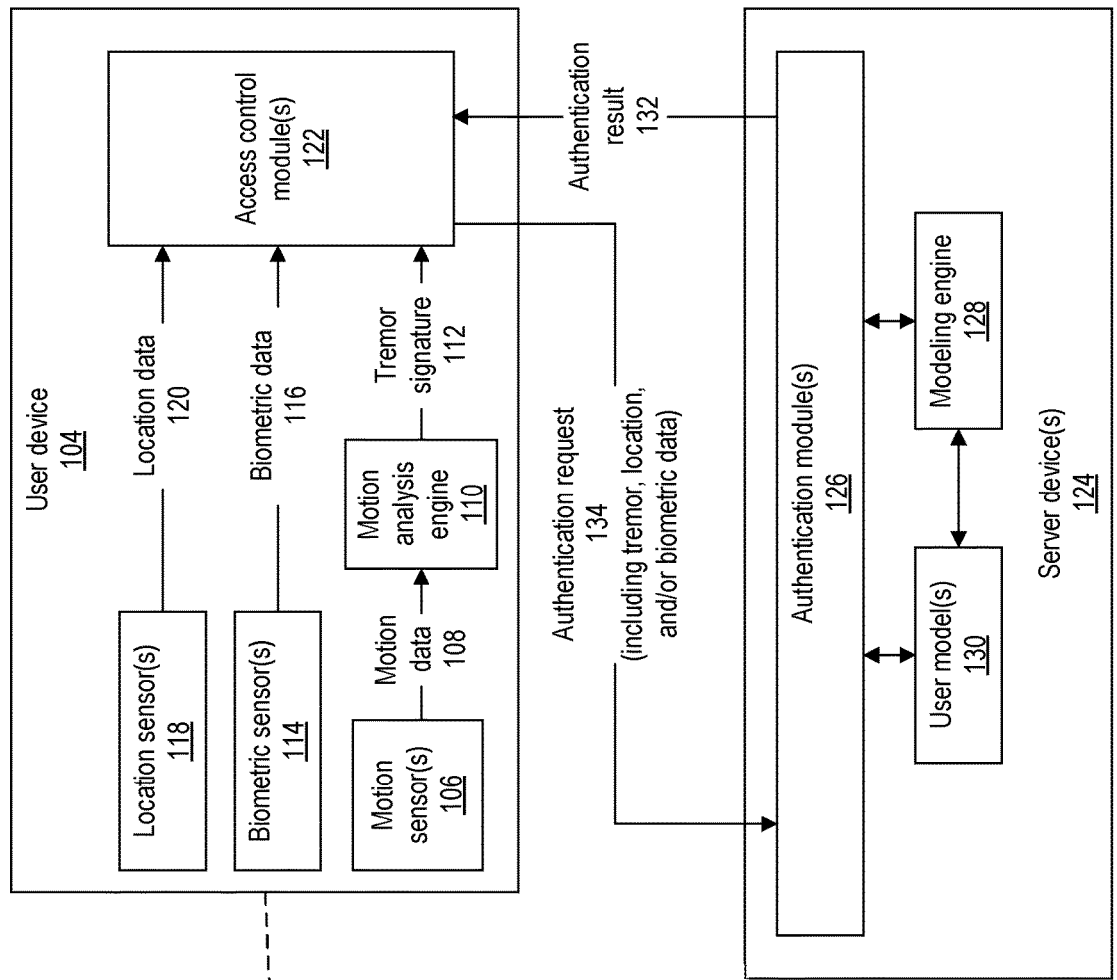
FIG. 1 depicts an example system for authentication based at least partly on a tremor signature, according to implementations of the present disclosure.
Figure 1:
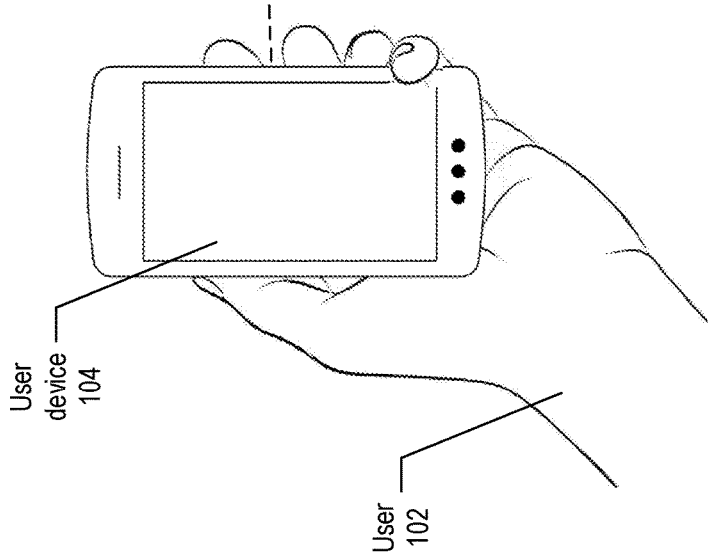

Implementations of the present disclosure are directed to systems, devices, methods, and computer-readable media for authenticating an individual based at least partly on a motion signature, also described as a tremor signature. In some implementations, motion data is collected through one or more motion sensors, such as accelerometers, gyroscopic motion sensors, and so forth. The motion sensor(s) may be included in a portable computing device that is being held, worn, or otherwise manipulated by a user, such as a smartphone, tablet computer, wearable computer, and so forth. Based on the collected motion data, a tremor signature may be determined for the user. The tremor signature may be compared to a previously determined model for the user, the model describing a baseline (e.g., typical or normal) tremor signature of the user. If the current tremor signature corresponds to the model, or is sufficiently close to the model (e.g., within a threshold similarity measurement), the user may be successfully authenticated and the identity of the user may be verified. Based on the successful authentication, the user may be provided with access to secure information, such as secure features of the computing device, application(s) executing on the computing device or elsewhere, data stored on the computing device or elsewhere, and/or other secure information.

In some implementations, the tremor signature is used in combination with other information to authenticate the user. Biometric data such as a fingerprint scan, image of the user's face, audio recording of the user's voice, the user's heartbeat, or other biometric information may be collected and compared to corresponding biometric information that is known to be that of the user. The result of the comparison may be employed to verify the identity of the user. As another example, a current location of the user's portable computing device may be determined based on signals from a satellite-based navigation system such as the Global Positioning System (GPS). The current location may be compared to baseline location(s), or a range of baseline location(s), of the user, and the result of the comparison may be used to verify the identity of the user. In some implementations, a model of the user may be developed over time, the model describing a baseline tremor signature, biometric data, and/or location(s) of the user. A currently determined tremor signature, biometric data, and/or location may be compared to the model to verify the user's identity and generate an authentication result which may be used for access control decisions. In some implementations, the model may be trained using a machine learning (ML) algorithm. Implementations support the use of any suitable ML algorithm, including supervised and unsupervised ML techniques. In some implementations, the model may be refined, trained, and/or otherwise modified over time based on periodically collected motion data, biometric data, and/or location data for the user. Accordingly, implementations provide a model that may be used over time to authenticate a user even as the user's tremor signature changes due to aging, changing health conditions, changing environmental conditions in proximity to the user, and/or other factors.

Among a population of individuals, a population of any appropriate size, each individual may exhibit a tremor signature that is unique within the population, or at least sufficiently unique to distinguish the particular individual from all or most of the others in the population. Accordingly, the tremor signature may be employed as a form of biometric data, or a bio-signal, that is useable to authenticate the individual (e.g., verify the individual's identity), in some instances in conjunction with other types of biometric data, location data, and/or other information. Implementations may be employed to authenticate the individual to gain access to secure data, log in to an application, gain access to use a computing device, activate a smart appliance or other device, gain access to a physical space (e.g., open a door), authorize a payment, and/or for other purposes.

The tremor signature, biometric data, location data, and/or other information may be employed in a variety of scenarios to authenticate the individual, including but not limited to the following: to access (e.g., unlock) a computing device such as a portable computing device (e.g., smartphone, tablet computer, wearable computer, etc.); to access (e.g., log in to) an application executing on a computing device, or to access a particular feature or set of features of the application; to activate and/or operate a device such as a smart appliance, vehicle, entertainment console, and so forth; to authorize a payment or other transaction through a point-of-sale (POS) terminal, ATM, vending machine, service kiosk, application, and so forth; and/or to gain access to a secure physical location, such as a secured building or room.

In each of these scenarios, there may be little or no explicit action performed by the individual to be authenticated, beyond the individual holding the portable computing device that includes the sensors that collect the motion data, biometric data, and/or location data. Accordingly, the authentication methods described herein may be described as a form of passive and/or immersive authentication. For example, when the individual picks up and holds their smartphone, the smartphone may be activated in response to a successful authentication of the individual based on their determined tremor signature, biometric data, and/or location data. As another example, when the individual approaches a door and attempts access, the door may be opened in response to a successful authentication of the user based on their tremor signature, biometric data, and/or location data which is collected through the user's portable computing device when it is in proximity to the door. As another example, when the individual attempts a purchase or other transaction, the individual may be prompted to hold their portable computing device near the POS terminal, ATM, financial kiosk, or other device that is involved in the transaction. The transaction may be allowed in response to the successful authentication of the individual based on their tremor signature, biometric data, and/or location data which is collected through the user's portable computing device when it is in proximity to the POS terminal, ATM, kiosk, or other device.

By providing such a passive or immersive form of authentication, implementations provide an authentication technique that is unobtrusive and easy from the perspective of the individual being authenticated, with minimal effort expended by the individual. This provides a more positive user experience compared to traditional techniques in which the individual may be asked to remember and enter a username, password, personal identification number (PIN), answers to knowledge-based questions (e.g., what is your mother's maiden name?), and/or other credential(s). Moreover, implementations provide an authentication technique that is more secure and less vulnerable to spoofing compared to traditional authentication methods. Traditional user credentials (e.g., password, PIN, etc.) may be guessed or stolen, but a tremor signature based on the individual's unique body tremor(s) would be much more difficult to spoof FIG. 1 depicts an example system for authentication based at least partly on a tremor signature, according to implementations of the present disclosure. As shown in the example of FIG. 1, a user device 104 may be held or worn by a user 102. The user device 104 may include any suitable type of computing device. In some instances, the user device 104 is a portable (e.g., mobile) computing device such as a smartphone, tablet computer, wearable computer, and so forth. As the user 102 holds the user device 104, the portion of the user's body in contact with the user device 104 may exhibit a tremor. As used herein, a tremor may be a set of motions that are at least approximately periodic, such that the motion(s) exhibit a regular and/or repeating pattern. The motion(s) may be translational motions relative to one or more linear axes. The motion(s) may also be rotational motions relative to one or more rotational axes. Accordingly, a tremor may be decomposed as a set of linear and/or rotational motions. As described above, the tremor may be unique to the user 102 among a population of users.

The motion(s) of the tremor may be detected by one or more motion sensors 106 that are incorporated into the user device 104. The motion sensor(s) 106 may include accelerometers, gyroscopic motion sensors, and/or other types of sensors. The motion sensor(s) 106 may generate motion data 108 describing the detected motion(s) of the portion of the user's body. The motion data 108 may be analyzed by a motion analysis engine 110, which may determine a tremor signature 112 based on the motion data 108. The tremor signature 112 may describe and characterize the motion(s) (e.g., the tremor) that is exhibited by the portion of the user's body that is in contact with the user device 104. For example, if the user device 104 is a smartphone, tablet computer, portable gaming device, or other type of computing device being held in the user's hand(s), the tremor signature 112 may describe the tremor of the user's hand(s), finger(s), wrist(s), and so forth. If the user device 104 is a wearable computing device 104 worn on the user's wrist, ankle, or head, then the tremor signature 112 may describe the tremor exhibited by the user's wrist, ankle, or head. The tremor signature 112 may also be described as a motion signature, tremor biometric, or motion biometric. The tremor signature 112 is described further below.

The tremor signature 112 may be provided to access control module(s) 122 executing on the user device 104. In some implementations, the access control module(s) 122 may also receive biometric data 116 generated by one or more biometric sensors 114, and/or location data 120 generated by one or more location sensors 118. The biometric sensor(s) 114 and/or location sensor(s) 118 may be components of the user device 104, or may be external to the user device 104 and in communication with the user device 104 over one or more networks. The biometric data 116 may include, but is not limited to, one or more of the following:

Image(s) and/or video data of a portion of the user's face, to be used for facial recognition. Facial recognition may include capturing an image of the user's face and comparing certain points on the face (e.g., location of eyes, mouth, nose, etc.) with previously gathered information regarding the user. Authentication may also be based on comparing a detected eye color of the user to previously stored information describing the user's eye color.

A heartbeat and/or pulse of the user. The heartbeat and/or pulse may be determined by capturing a video segment of the user, stabilizing the captured video data, applying motion magnification techniques to the stabilized video data, and analyzing the stabilized, magnified video data to determine a waveform, or at least a frequency, of the user's heartbeat. The heartbeat and/or pulse may also be determined through a pulse monitoring sensor.

Audio data of the user's voice, to be used for voice print identification of the user. For example, the user may be prompted to repeat (e.g., one or more times) a word or multi-word phrase presented on a user device. A microphone may record audio data of the user's speech, and the recorded audio may be to previously stored voice data associated with the user.

Fingerprint data, retinal scan data, and/or neural activity data (e.g., brainwave data) to be compared to previously collected fingerprint(s), retinal scan(s), and/or neural activity data of the user.

Electrocardiogram data describing electrical activity in the user's heart, to be compared to previously collected electrocardiogram data for the user.

Conductivity data for the user. In some instances, a body signature of the user may be determined and used for authentication. A body signature may describe the particular way in which a signal, such as a haptic or electrical signal, is attenuated or otherwise changes as it passes through the user's body (or a portion thereof). Given the particular musculature and/or other physiological aspects of the user, a body signature may be unique to the user among a population of users, and may therefore be used to authenticate the user.

The location data 120 may describe a current location of the user device 104, based on signals received from a satellite-based navigation system such as GPS. Other location determination techniques may also be employed. For example, network transceivers may detect one or more wireless network signals present in vicinity of the user device 104 and, based on the detected network(s), determine the location of the user device 104.

The access control module(s) 122 may send, over one or more networks, an authentication request 134 to one or more authentication modules 126 executing on one or more server devices 124. The server device(s) 124 may include any suitable number and/or type of computing devices. In some instances, the server device(s) 124 are distributed computing device(s) and/or cloud computing server(s). The authentication request 134 may include the tremor signature 112, the biometric data 116, and/or the location data 120 determined on the user device 104. The authentication request 134 may request an authentication of the user 102 for access to secured features of the user device 104 itself For example, the request 134 may be to unlock the device 104 to enable access to the applications running on the device, the data stored on the device, and/or other features of the device. In some instances, the authentication request 134 may request access to a particular application running on the device, such that the request 134 is generated as part of an application login flow. In some instances, the authentication request 134 may request access to a particular feature of an application, particular data stored on the user device 104 or elsewhere, and/or other secure information.

The authentication module(s) 126 may compare the tremor signature 112, the biometric data 116, and/or the location data 120 to a user model 130 associated with the user 102. The user model 130 may describe the baseline tremor signature 112, biometric data 116, and/or location data 120 for the user 102, as determined over a period of time during which such information has been collected regarding the user 102. If the tremor signature 112, biometric data 116, and/or location data 120 that has been collected is sufficiently similar to that in the user model 130, the authentication module(s) 126 may verify the user's identity and send a positive authentication result 132 (indicating successful authentication) to the access control module(s) 122. If the tremor signature 112, biometric data 116, and/or location data 120 that has been collected is not sufficiently similar to that in the user model 130, the authentication module(s) 126 may send a negative authentication result 132 (indicating unsuccessful authentication) to the access control module(s) 122.

Based on a successful authentication result 132, the access control module(s) 122 may enable the user 102 to access those features, application(s), and/or data that was requested. Based on an unsuccessful authentication result 132, the access control module(s) 122 may disable or block such access. In some implementations, based on an unsuccessful authentication result 132, the access control module(s) 122 may attempt an authentication of the user through other techniques. For example, the module(s) 122 may perform a credential-based authentication of the user 102. The access control module(s) 122 may request certain credential(s) from the user 102, such as a username, password, PIN, answers to knowledge-based questions (e.g., "what is your mother's maiden name?"), and/or other types of credential(s), and the provided credential(s) may be compared to previously stored credential(s) of the user to determine whether the user is authenticated. Accordingly, even if the user 102 cannot be authenticated through a combination of tremor signature, biometric data, and/or location data, the user 102 may be granted the requested access if they can provide the appropriate credential(s).

In some implementations, the server device(s) 124 execute a modeling engine 128. The modeling engine 128 may develop the user model(s) 130 based on received information for one or more users, such as tremor data, biometric data, and/or location data. In some implementations, the modeling engine 128 may train, refine, or otherwise update the user model(s) 130 over time based on tremor data, biometric data, and/or location data that is received over time, to ensure that the user model(s) 130 reflect current characteristic(s) of the user(s). In this way, a model 130 for a user may adapt over time based on the changes in tremor and/or other biometric data for the user caused by aging, changing health conditions, changing environmental conditions, and so forth. The modeling engine 128 may employ any suitable ML techniques to develop and/or refine the model(s) 130.

Although the example of FIG. 1 depicts certain operations being performed on the user device 104 and other operations being performed on the server device(s) 124, implementations are not limited to this example. Various operations may be performed on one or both of the user device 104 and/or server device(s) 124 as appropriate. For example, the authentication module(s) 126 and/or modeling engine 128 may execute on the user device 104, and the user model(s) 130 may be stored on the user device 104 or elsewhere. As another example, the motion analysis engine 110 may execute on the server device(s) 124 to determine the tremor signature 112 based on an analysis of the motion data 108 that is communicated from the user device 104 to the server device(s) 124. In some implementations, the collected data and/or model(s) 130 may be stored and/or processed in a secure enclave (e.g., secure portion of memory) on the user device 104 and/or server device(s) 124.

Figure 2:
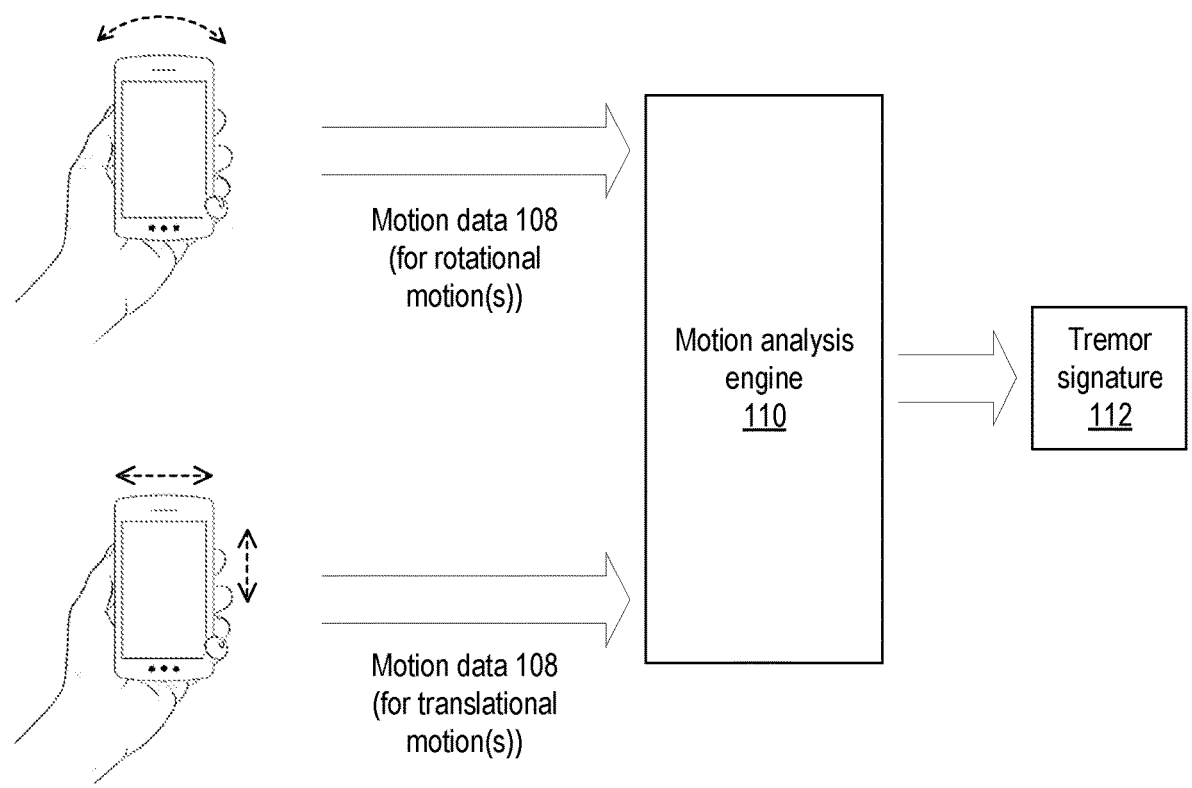
FIG. 2 depicts example types of motion data employed to determine a tremor signature, according to implementations of the present disclosure.

FIG. 2 depicts example types of motion data 108 employed to determine a tremor signature 112, according to implementations of the present disclosure. As shown in the example, motion data 108 may describe rotational motion(s) of the user device 104 with respect to one or more rotational axes. For example, rotational motion(s) may include a yaw, pitch, and/or roll of the user device 104. The motion data 108 may also describe translational motion(s) of the user device 104, such as linear (e.g., back-and-forth) motion(s) along one or more linear axes (e.g., an X-axis, Y-axis, and/or Z-axis). Accordingly, the motion data 108 may be described as a mathematical (e.g., vector) combination of motions with respect to multiple axes.

In some implementations, the tremor signature 112 may be a waveform in multiple dimensions with respect to the multiple axes. In some implementations, the tremor signature 112 may be determining by transforming the motion data 108 into a frequency domain, using a Fourier transform or other algorithm. Accordingly, the tremor signature 112 may include a set of features, where each feature is a particular frequency component of the movement with respect to a particular axis, the frequency component exhibiting a particular amplitude. A tremor signature 112 may exhibit a lower frequency carrier frequency with any number of higher frequency modulations on top of the carrier, such that the carrier is a basic core of the tremor signature. For example, the carrier frequency may be within the range of 6-25 Hz.

In some implementations, one or more known contributions to the motion data 108 may be filtered out of the motion data 108 prior to processing to determine the tremor signature 112. For example, a gait component of the motion data 108 may be removed based on a determination that the user 102 is walking, running, biking, or otherwise moving in a way that creates particular frequency components in the motion data 108. Alternatively, such a gait component may be included in the model 130 and used to authenticate the user 102. For example, the model 130 may include different tremor signatures 112 for the user running, walking, biking, or at rest. The model 130 may also include different tremor signatures 112 for other situations or contexts, such as different tremor signatures for different time of day, time of the year, ambient temperature, altitude, climate, posture of the user (e.g., sitting, standing, or laying down), angle or position at which the user device 104 is being held, medication being taken by the user 102, use of caffeine or other stimulants, presence of health conditions, and so forth. In some implementations, the model 130 may more heavily weight more recent tremor, biometric, and/or location data (e.g., the last 30 days).

The model 130 for a user 102 may be refined through ongoing (e.g., periodic) collection of tremor, biometric, and/or location data for the user 102. With each collection of data, the collected data may be compared to the model. If the collected data is within a threshold degree of similarity to the data in the model, the user's identity may be confirmed and the collected data may be used to further retrain and/or refine the model 130, ensuring the model 130 is up to date. If the collected data is outside the threshold degree of similarity, the user's identity may be unconfirmed and credential-based authentication may be used as a fallback option. If the credential-based authentication is successful, confirming the user's identity, the collected tremor, biometric, and/or location data may be used to further retrain and/or refine the model 130 to reduce the probability that subsequent false negative authentications of the user 102 are generated using the model 130.

The ongoing, periodic collection and analysis of the tremor data, biometric data, and/or location data provides for an immersive and passive authentication of the user 102 that may not require any actions to be taken by the user 102, beyond holding or wearing the user device 104, at least until credential-based authentication may be performed based on a failed passive authentication as described above. Accordingly, if the user 102 picks up their user device 104, is authenticated, and uses the device for a time, then sets down the device, another individual may be blocked from using the device if they pick it up and attempt to use it. In such a scenario, the system may detect a change in the tremor signature and/or biometric data of the user attempting access, and disable such access.

Figure 3:
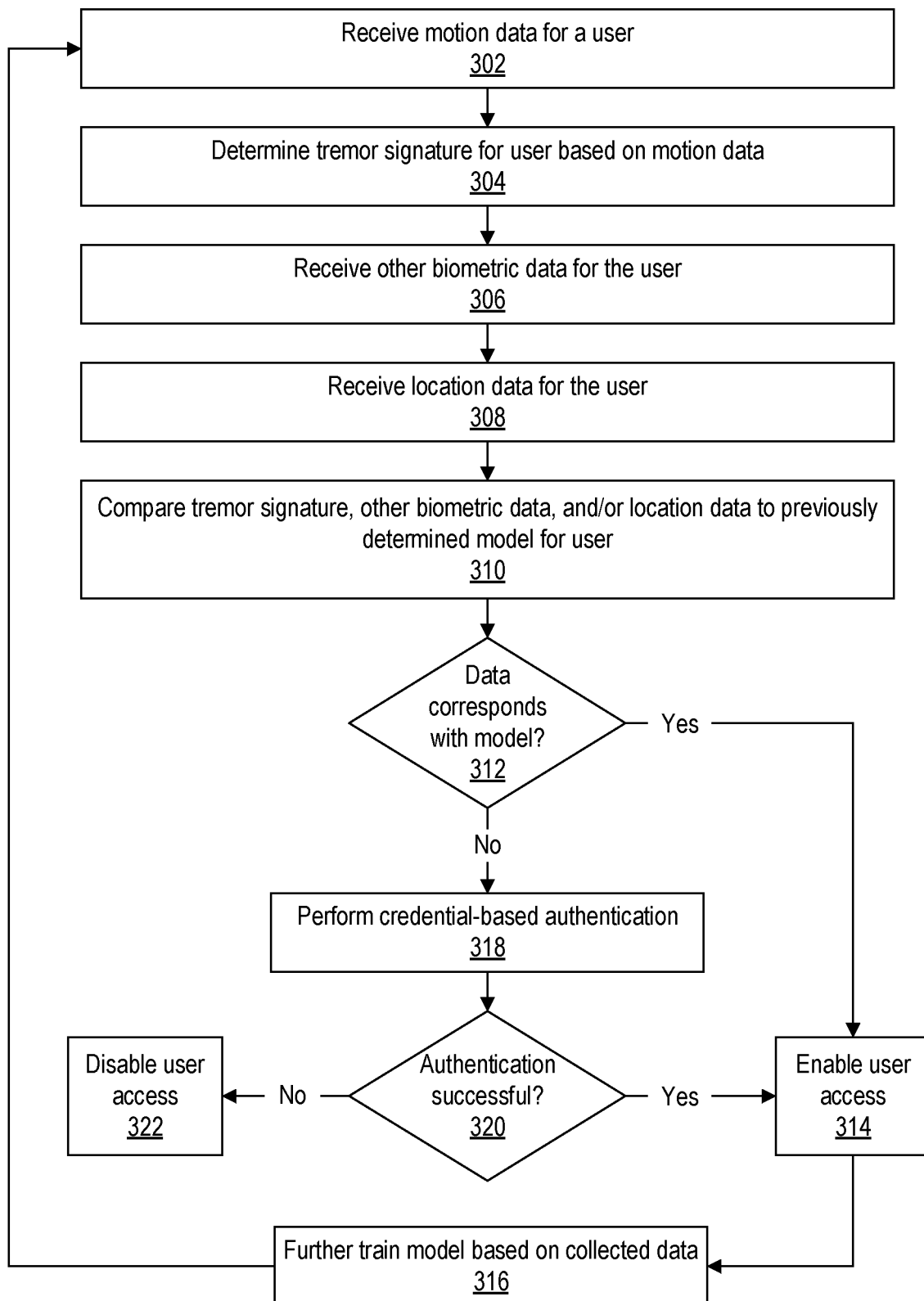
FIG. 3 depicts a flow diagram of an example process for authentication based at least partly on a tremor signature, according to implementations of the present disclosure.

FIG. 3 depicts a flow diagram of an example process for authentication based at least partly on a tremor signature, according to implementations of the present disclosure. Operations of the process may be performed by one or more of the motion analysis engine 110, the access control module(s) 122, the authentication module(s) 126, the modeling engine 128, and/or other software module(s) executing on the user device 104, the server device(s) 124, or elsewhere.

The motion data 108 may be received (302) as described above. In some implementations, the motion data 108 may be filtered prior to being analyzed, such as to remove gait-caused components as described above. In some implementations, a low-pass filter may be applied to select frequency components that are lower than a threshold frequency, and attenuate those frequency components that are higher than the threshold frequency. Other types of filtering may also be applied, such as high-pass filtering to select for higher frequency components, and/or band-pass filtering to select for frequency components within a particular frequency range. The tremor signature 112 may be determined (304) based on the motion data 108 or the filtered motion data.

In some implementations, the other biometric data 116 may be received (306) and/or the location data 120 may be received (308). The tremor signature 112, biometric data 116, and/or location data 120 may be compared (310) to the user model 130 for the user 102 attempting access, the user model 130 having been previously generated, stored, and refined over time as described above.

Based on the comparison, a determination is made (312) whether the current tremor signature 112, biometric data 116, and/or location data 120 corresponds with the model 130 for the user 102. If so, the requested access may be enabled or provided (314). If not, a credential-based authentication may be performed (318) as described above. If the credential-based authentication is successful (320), the requested access may be enabled or provided (314). If the credential-based authentication is not successful (320) (e.g., if the user-provided credentials are not valid, are out of date, or do not correspond with the stored credentials of the user), the requested access may be disabled (322).

In some implementations, an algorithm for comparing matrix properties (e.g., the matrix determinant) of matrices may be employed to analyze combined biometric data and determine the authentication decision. For example, the algorithm may combine biometric data from two different biometric sensors to determine unique authentication signature for a user. From each biometric data set, the algorithm may extract N parameters (e.g., N=3, N=6, etc.) to be measured. The resulting data may be stored in an N×N matrix. For example, for the tremor biometric, the algorithm may extract parameters that are the peak amplitudes of motion along x-, y-, and/or z-axes, for the cardiac electrical signature biometric, the algorithm may extract the peak values of the q, r, and s intervals, and for the tremor biometric, the algorithm may extract the angular rotational values relative to the x-, y-, and/or z-axes. Each measurement of biometric data (e.g., taken for 5-10 seconds) may generate multiple (e.g., dozens of) values for each cell of the N×N matrix. Accordingly, the mean values of each parameter may be stored after each measurement. In some examples, a parallel matrix can also be constructed that stores an N×N set of statistical results derived from the multiple (e.g., dozens of) data points measured for each parameter under observation, statistical results such as mean, median, mode, standard deviation, and so forth. If all the statistical data is included, a 12×12 or bigger data matrix may be generated, for example, by measuring nine biometric parameters in real-time.

Once the matrix is constructed, a number of properties can be derived from it, such as the matrix determinant, eigenvalue, various statistical properties of each row and column, and so forth. These derived values or properties may be employed as the combined biometric authentication signature, once a baseline or accurate measurement set is identified for a user. In some implementations, this baseline signature or baseline model can be continuously refined over time using ML techniques. When the user attempts to authenticate on the user device, a current data matrix may be constructed from the same biometrics under observation. The signature data set may be derived by computing the matrix properties from the current data set, and compared to the baseline data set described above. If the data values differ by less than a given threshold, the user is authenticated.

The final comparison between the derived signature values from the current and baseline data sets could be weighted in many different ways for the "yes" or "no" authentication decision. In one example, the baseline signature numbers are designated as b1, b2, b3, and b4, and the currently measured values may be designated c1, c2, c3, and c4. The final comparison algorithm may tolerate a difference of 5% between b1 and c1 and between b3 and c3, but may only tolerate a difference of 2% for the remaining two sets of values. Moreover, a cap for the total deviation of values (b1+b2+b3+b4−c1−c2−c3−c4) may be defined to not exceed a certain amount for a positive identification. Further, implementations can assign different weights to each set of signature values, for example, such that the difference between b1 and c1 is weighed 4 times greater than the other data in calculating the total error. As an example, a non-positive identification may be decided if the total deviation (or error) is larger than a given amount or if the deviation in one individual parameter set exceeds a given threshold. Various types of acceptance criteria can be defined for the final comparison algorithm, according to implementations.

The above example is a somewhat simplified example of an N×N measurement matrix, the accompanying statistical matrix, the computed signature values, and the final comparison algorithm. In some implementations, a larger number (e.g., a dozen or more) of measurement parameters can be obtained for each biometric under observation. Based on the statistical computations, large matrices can be built resulting in lengthy arrays of derived signature values. The final comparison algorithm may apply (e.g., complex) rules and weights to the data sets before an acceptance decision regarding authentication is made. Moreover, the example algorithm type described above is one of many possible algorithms that could be used by implementations to arrive at decisions for tremor-based authentication.

The implementations described herein employ a multiplicity model algorithm that does not rely on only a single data-set model to compare against for authentication, but instead may maintain a large number of potential models of combined biometric data-sets that are applicable to different circumstances or modes the user might be in. For example, different circumstances or modes may be that the user is currently exercising, has just finished exercising, is stressed at work, is relaxing at home, and/or in other situations. A potential new contextual authentication model could be created when a series of failures with self-similar data sets is detected, or upon the user's request.

If any of the measured biometric data accompanying an authentication request does not match any of the models but is, for example, close to two or more models (e.g., within a threshold degree of similarity between the model and the measured biometric data), the user device may be instructed to present a contextual question to the user (e.g., "did you just exercise?") in an attempt to eliminate contesting applicable models. The user device could also pose such questions when it is operating in a learning mode to train and/or other refine a newly created authentication data model.

In some implementations, to deter fraud the system could randomize between the true semantics of the posed question or its complement. In other words, if the possible matches include the currently exercising model, the user device could pose a question to as if the user is currently exercising. Alternatively, the user device could pose the opposite question such as whether the user is just waking up, such that the correct response to that question is in the negative. Randomizing the semantics of the question posed by the user device creates a level of unpredictability in the authentication process, which may make it difficult for the user (e.g., the fraud-attempting user) to guess which model(s) the system is trying to eliminate as possibilities in the current situation.

If the user 102 is successfully authenticated through the passive authentication (312), based on tremor data, biometric data, and/or location data, or through the credential-based authentication (320), the current tremor data, biometric data, and/or location data may be used to further train or refine (316) the model 130 to ensure the model 130 is current. The process may then iterate by returning to 302, to provide ongoing immersive and passive user authentication.

In some implementations, data from each biometric, such as heartbeat, bio-electrical impedance, location, etc., that itself may not be easily isolatable to a given individual, may be combined with the tremor signature or tremor data to create a unique individual authentication signature, as described above. This combining of biometrics can be pair-wise, that is, heartbeat with tremor, bio-electrical impedance with tremor, etc., or could be in any multiplicity, such as combining two other biometrics with tremor data, or three other biometrics with tremor data, and so forth. Implementations may be used for continuous authentication, such as in mission-critical applications, wherein the application and/or device shuts down and/or its data gets completely wiped or otherwise rendered inaccessible if an unrecognized user is detected using the device or application. As used herein, a continuous authentication describes a periodically iterating authentication, in which the user is initially authenticated and then re-authenticated periodically (e.g., every five minutes), to ensure that the same user is still using the computing device. In some implementations, the computation for the authentication decision includes steps of classifying the data obtained into parameter matrices, performing statistical operations on the parameter matrices, then computing properties of the resulting statistical data matrix to obtain an authentication signature profile (e.g., a series of values in any data format, such as an array, matrix, etc.), and then running comparison algorithms on the computed authentication signature profile versus the baseline. Implementations may also employ other suitable authentication algorithms.

In some implementations, a large number of potential models of combined biometric data sets may be created and maintained, and such models of combined biometric data sets may be applicable to different circumstances or modes the user might be in, such as exercising, just finished exercising, stressed at work, relaxing at home, and so forth. A potential new contextual authentication model could be created when a series of failures with self-similar data sets is detected. In some implementations, a potential new contextual authentication model could be created upon user's request. In some implementations, if any measured biometric data accompanying an authentication request does not match any of the models but is close to two or more models (e.g., is within a threshold degree of similarity between the model and the measured biometric data), then the device could pose a contextual question (such as "did you just work out?") in order to eliminate contesting applicable models. In some examples, the device could also pose such questions when it is in a learning mode for a newly created authentication data model. In some implementations, to deter fraud the system could randomize between the true semantics of the posed question or its complement, as described above.

Figure 4:
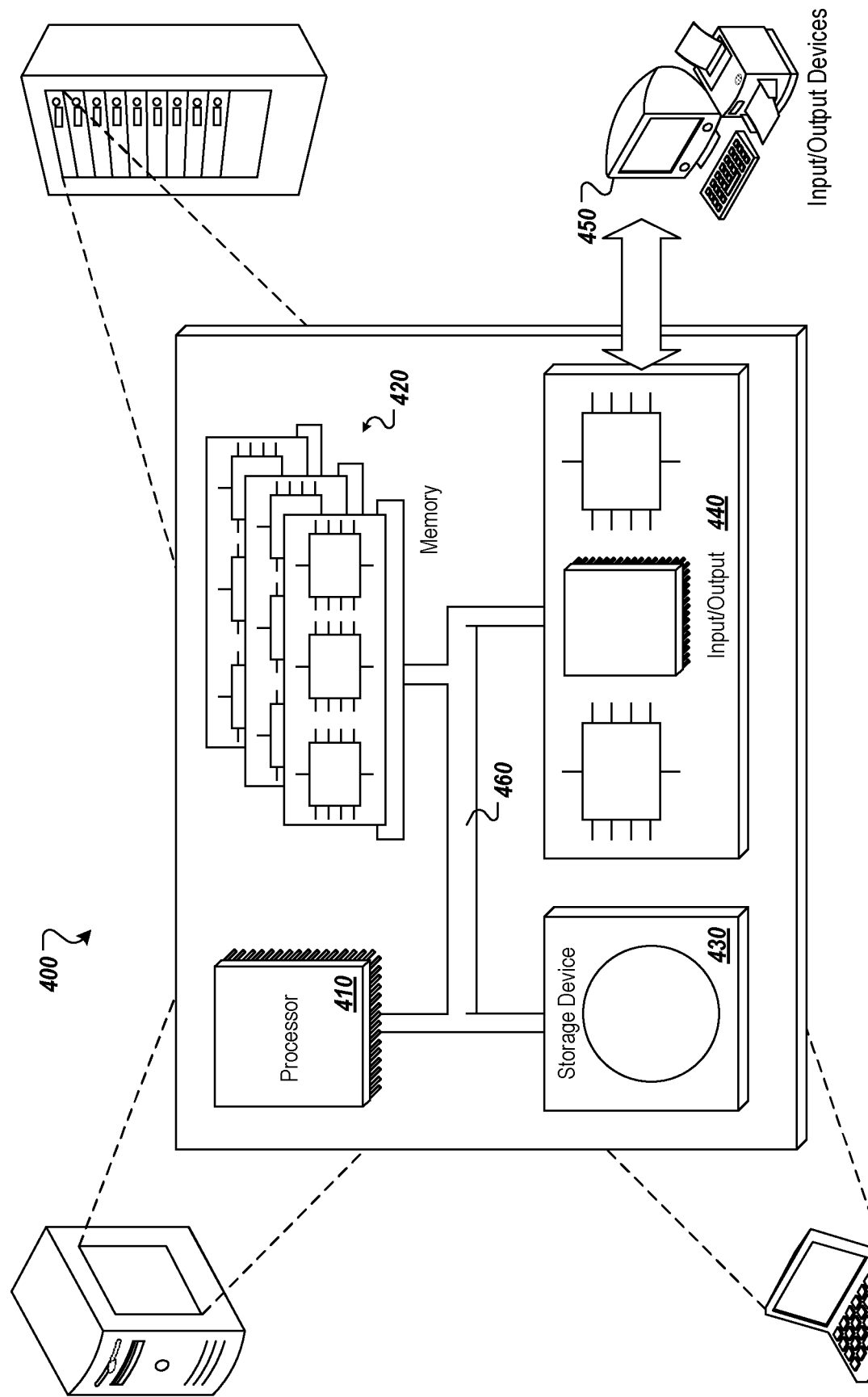
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the user device 104, the server device(s) 124, and/or other computing device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
   at least one processor; and
   a memory communicatively coupled to the at least one processor, the memory storing instructions which, when executed by the at least one processor, cause the at least one processor to perform operations comprising:
      receiving motion data collected by one or more motion sensors of a user device disposed on at least one body part of a user, wherein the motion data is representative of one or more motions of the at least one body part detected via one or more additional motions of the user device during a first period of time;
      determining a tremor signature for the user based on an analysis of the motion data;
      receiving biometric data collected by one or more biometric sensors during the first period of time, the biometric data describing at least one physiological characteristic of the user other than the tremor signature;
      receiving location data associated with the user device while the user device is detecting the one or more additional motions during the first period of time;
      determining an authentication result for the user based on the tremor signature, the biometric data, and the location data, and a user model associated with the user, wherein the user model is determined by applying a machine learning algorithm to a baseline tremor signature, a baseline biometric data, and baseline location data acquired over a second period of time different from the first period of time, and wherein the user model comprises an expected tremor signature, expected biometric data, and expected location data during the first period of time, wherein a successful authentication corresponds to a threshold amount of similarity between:
         a first collection of the tremor signature, the biometric data, and the location data; and
         a second collection of the expected tremor signature, the expected biometric data, and the expected location data;
      in response to the authentication result indicating an unsuccessful authentication:
         sending, by the at least one processor, a request to the user device for a credential-based authentication of the user, wherein the request is configured to cause the user device to receive an input for the credential-based authentication;
         receiving the input from the user device; and
         authenticating the user based on the input; and
      in response to the authentication result indicating a successful authentication:
         updating the user model based on the tremor signature, the biometric data, and the location data.

2. The system of claim 1, the operations comprising:
   in response to authenticating the user based on the input:
      sending a second request to the user device, wherein the second request is configured to cause the user device to receive a second input representative of a state of the user; and
      receiving the second input from the user device.

3. The system of claim 2, the operations comprising generating a second baseline tremor signature based on the tremor signature and a second baseline biometric data based on the biometric data.

4. The system of claim 3, wherein the second baseline tremor signature and the second baseline biometric data are associated with the state of the user.

5. The system of claim 1, the operations comprising generating additional biometric data based on an analysis of motion data, wherein the additional biometric data comprises a waveform associated with a heartbeat of the user.

6. The system of claim 1, the operations comprising removing a component of the motion data based on the analysis of the motion data, wherein the component corresponds to a periodic motion of the at least one body part of the user.

7. The system of claim 6, wherein the component of the motion data corresponds to a periodic component.

8. The system of claim 1, wherein the input comprises a username, a personal identification number, a password, or any combination thereof.

9. The system of claim 1, wherein the biometric data comprises audio data associated with a recording from the user device.

10. A computer-implemented method performed by at least one processor, the method comprising:
   receiving, by the at least one processor, motion data collected by one or more motion sensors of a user device disposed on at least one body part of a user, wherein the motion data is representative of one or more motions of the at least one body part detected via one or more additional motions of the user device during a first period of time;
   determining, by the at least one processor, a tremor signature for the user based on an analysis of the motion data;
   receiving, by the at least one processor, biometric data collected by one or more biometric sensors during the first period of time, the biometric data describing at least one physiological characteristic of the user other than the tremor signature;
   receiving location data associated with the user device while the user device is detecting the one or more additional motions during the first period of time;
   determining, by the at least one processor, an authentication result for the user based on the tremor signature, the biometric data, and the location data, and a user model associated with the user, wherein the user model is determined by applying a machine learning algorithm to a baseline tremor signature, a baseline biometric data, and baseline location data acquired over a second period of time different from the first period of time, and wherein the user model comprises an expected tremor signature, expected biometric data, and expected location data during the first period of time, wherein a successful authentication corresponds to a threshold amount of similarity between:
      a first collection of the tremor signature, the biometric data, and the location data; and
      a second collection of the expected tremor signature, the expected biometric data, and the expected location data;
   in response to the authentication result indicating an unsuccessful authentication:
      sending, by the at least one processor, a request to the user device for an input-based authentication of the user, wherein the request is configured to cause the user device to receive an input for the input-based authentication;

receiving, by the at least one processor, the input from the user device; and authenticating, by the at least one processor, the user based on the input; and in response to authenticating the user based on the input:

updating, by the at least one processor, the user model based on the tremor signature, the biometric data, and the location data.

11. The method of claim 10, wherein the input is representative of a state of the user, and wherein the state of the user comprises a posture of the user, a health condition of the user, a motion context associated with the user, or any combination thereof.

12. The method of claim 10, wherein the request is configured to cause the user device to display a question.

13. The method of claim 10, comprising:

in response to authenticating the user based on the input:

sending, by the at least one processor, a second request to the user device, wherein the second request is configured to cause the user device to receive a second input representative of a state of the user;

receiving, by the at least one processor, the second input from the user device; and updating, by the at least one processor, the user model based on the second input.

14. The method of claim 10, comprising:

receiving, by the at least one processor, the location data collected by one or more location sensors.

15. The method of claim 14, wherein the location data comprises one or more wireless network signals.

16. The method of claim 10, comprising receiving, by the at least one processor, video data corresponding to the motion data.

17. The method of claim 16, comprising generating, by the at least one processor, additional biometric data based on an analysis of the video data, wherein the additional biometric data comprises a waveform associated with a heartbeat of the user.

18. One or more non-transitory, computer-readable media storing instructions which, when executed by at least one processor, cause the at least one processor to perform operations comprising:

receiving motion data collected by one or more motion sensors of a user device disposed on at least one body part of a user, wherein the motion data is representative of one or more motions of the at least one body part detected via one or more additional motions of the user device during a first period of time;

determining a tremor signature for the user based on an analysis of the motion data;

receiving biometric data collected by one or more biometric sensors during the first period of time, the biometric data describing at least one physiological characteristic of the user other than the tremor signature;

receiving location data associated with the user device while the user device is detecting the one or more additional motions during the first period of time;

determining an authentication result for the user based on the tremor signature, the biometric data, and the location data, and a user model associated with the user, wherein the user model is determined by applying a machine learning algorithm to a baseline tremor signature, a baseline biometric data, and baseline location data acquired over a second period of time different from the first period of time, and wherein the user model comprises an expected tremor signature, expected biometric data, and expected location data during the first period of time, wherein a successful authentication corresponds to a threshold amount of similarity between:

a first collection of the tremor signature, the biometric data, and the location data; and a second collection of the expected tremor signature, the expected biometric data, and the expected location data;

in response to the authentication result indicating an unsuccessful authentication:

sending a request to the user device for a credential-based authentication of the user, wherein the request is configured to cause the user device to receive an input for the credential-based authentication; and receiving the input from the user device; and authenticating the user based on the input; and in response to authenticating the user based on the input:

updating the user model based on the tremor signature, the biometric data, and the location data.

19. The one or more non-transitory, computer-readable media of claim 18, wherein the biometric data comprises conductivity data based on an electrical signal passing through the user.

20. The one or more non-transitory, computer-readable media of claim 18, wherein the instructions which, when executed by the at least one processor, cause the at least one processor to perform operations comprising filtering one or more frequency components from the motion data based on the analysis of the motion data.

* * * * *

UNITED STATES PATENT AND TRADEMARK OFFICE
CERTIFICATE OF CORRECTION

| | |
|---|---|
| PATENT NO. | : 11,822,633 B1 |
| APPLICATION NO. | : 17/076536 |
| DATED | : November 21, 2023 |
| INVENTOR(S) | : Desai et al. |

It is certified that error appears in the above-identified patent and that said Letters Patent is hereby corrected as shown below:

On the Title Page

1. In Item (72), under "Inventors", in Column 1, Line 3, delete "Bradley" and insert -- Bradly --, therefor.

In the Specification

2. In Column 3, Line 37, delete "spoof" and insert -- spoof. --, therefor.

3. In Column 7, Line 19, delete "spoof" and insert -- spoof. --, therefor.

4. In Column 8, Line 65, delete "itself" and insert -- itself. --, therefor.

5. In Column 10, Line 31, delete "determining" and insert -- determined --, therefor.

6. In Column 13, Line 36, delete "other refine" and insert -- refine --, therefor.

In the Claims

7. In Column 20, Lines 9-12, in Claim 5, delete "the operations comprising generating ...... heartbeat of the user." and insert the same on Line 8, after "claim 1," as a continuation point.

8. In Column 21, Line 7, in Claim 10, delete "in response to authenticating" and insert the same on Line 8, before "the user based", as a new sub-point.

9. In Column 22, Line 35, in Claim 18, delete "authentication; and" and insert -- authentication; --, therefor.

Signed and Sealed this
First Day of October, 2024

Katherine Kelly Vidal
*Director of the United States Patent and Trademark Office*